US006722792B2

(12) United States Patent
Raj et al.

(10) Patent No.: US 6,722,792 B2
(45) Date of Patent: Apr. 20, 2004

(54) OPTICAL INTERCONNECT WITH INTEGRAL REFLECTIVE SURFACE AND LENS, SYSTEM INCLUDING THE INTERCONNECT AND METHOD OF FORMING THE SAME

(75) Inventors: Kannan Raj, Chandler, AZ (US); C. Phillip McClay, Fountain Hills, AZ (US)

(73) Assignee: Primarion, Inc., Tempe, AZ (US)

( * ) Notice: Subject to any disclaimer, the term of this patent is extended or adjusted under 35 U.S.C. 154(b) by 0 days.

(21) Appl. No.: 10/055,679

(22) Filed: Jan. 22, 2002

(65) Prior Publication Data

US 2002/0096686 A1 Jul. 25, 2002

Related U.S. Application Data

(60) Provisional application No. 60/263,103, filed on Jan. 19, 2001, and provisional application No. 60/263,105, filed on Jan. 19, 2001.

(51) Int. Cl.[7] .................................................. G02B 6/36
(52) U.S. Cl. .............................. 385/88; 385/30; 385/33
(58) Field of Search ........................... 385/88, 129, 58, 385/16, 31, 30, 33, 15; 359/127, 634, 123, 558; 349/9

(56) References Cited

U.S. PATENT DOCUMENTS 5,369,529 A * 11/1994 Kuo et al. ................... 359/858
5,446,814 A * 8/1995 Kuo et al. ..................... 385/31
5,846,842 A * 12/1998 Herron et al. ............... 436/518
6,012,855 A * 1/2000 Hahn .......................... 385/89
6,454,470 B1 * 9/2002 Dwarkin et al. .............. 385/93
6,455,944 B1 * 9/2002 Kato et al. .................. 257/797

FOREIGN PATENT DOCUMENTS

| FR | 2 569 015 | 2/1986 |
| JP | 57 195209 | 11/1982 |
| JP | 62 132385 | 6/1987 |

OTHER PUBLICATIONS

Bestwick T, "A Silicon–Based Integrated Optical Manufacturing Technology," May 25, 1998, pp. 566–571.

Tran D. et al. "Monolithic Integrated Optical Micro–Bench for High Density Photonics Packaging," May 25, 1998, pp. 588–591.

* cited by examiner

*Primary Examiner*—Douglas Wille
(74) *Attorney, Agent, or Firm*—Snell & Wilmer L.L.P.

(57) ABSTRACT

An improved optical interconnect structure, system including the structure, and method of forming the structure and system are disclosed. The optical interconnect structure includes a waveguide and a reflective structure. Either the waveguide, the reflective structure, or both include a curved surface to facilitate focusing of light transmitted between the waveguide and an optoelectronic device.

5 Claims, 2 Drawing Sheets

OPTICAL INTERCONNECT WITH INTEGRAL REFLECTIVE SURFACE AND LENS, SYSTEM INCLUDING THE INTERCONNECT AND METHOD OF FORMING THE SAME

CROSS REFERENCE TO RELATED APPLICATIONS

This Application claims priority to Provisional Application Serial No. 60/263,103, entitled Comer Reflector with Tapered Waveguide and Integrated Lens, filed Jan. 19, 2001 and to Provisional Application Serial No. 60/263,105, entitled Corner Turning of Optical Wavefronts Using a Curve Reflector, filed Jan. 19, 2001.

FIELD OF THE INVENTION

The present invention generally relates to optical interconnects and systems including optical interconnects. More particularly, the invention relates to optical interconnects and systems suitable for providing a transmission path between optoelectronic devices and/or between an optoelectronic device and a waveguide such as a fiber ribbon and to methods of forming the interconnects and systems.

BACKGROUND OF THE INVENTION

Systems including optical interconnect devices are often used to transmit information at high data rates. For example, such systems are used for board-to-board, backplane, local area network (LAN), wide area network (WAN) and similar applications. Optical systems are advantageous compared to electrical interconnect systems because optical systems are generally less susceptible to electromagnetic interference, which often results in cross-talk within the system and external noise emission from the system, particularly as the rate of information transfer increases. However, optical interconnect systems are typically relatively expensive compared to electrical interconnect systems, and thus factors such as distance the transmitted signal must travel, bandwidth required by the system, cost, power consumption, signal integrity requirements, and the like are often considered before selecting a type of system.

Typical optical interconnect systems generally include an optoelectronic device such as a light emitting (e.g., laser) and/or a light detecting (e.g., a photodiode) device, an electronic device (e.g., an amplifier and/or a driver) coupled to the optoelectronic device, and waveguide material such as a fiber ribbon cable. The optoelectronic devices are often fabricated such that the active region. i.e., the area that emits or receives photos from the waveguide, is on the same surface as electrical connections for coupling the optoelectronic device to the corresponding electrical device. In this case, either the electrical connections or the optical connections must typically undergo an effective ninety degree bend to allow electrical coupling between the optoelectronic device and electronic device and optical coupling between the optoelectronic device and the waveguide. Prior-art methods and apparatus for coupling light between an optoelectronic device and a waveguide are generally relatively expensive to manufacture and/or are relatively inefficient at transferring light between the optoelectronic device and the waveguide. Accordingly, improved methods and apparatus for coupling an optoelectronic device to a waveguide and methods of forming the apparatus are desired.

SUMMARY OF THE INVENTION

The present invention provides an apparatus for coupling an optoelectronic device to a optical transmission medium or waveguide such as an optical fiber and a method of forming the apparatus. More particularly, the invention provides an optical interconnect device including reflective and focusing surfaces, systems including the device, and methods of forming the device and system.

The way in which the present invention addresses various drawbacks of the now-known optical interconnect devices and systems is discussed in greater detail below. However, in general, the improved optical interconnect device and system in accordance with the present invention are relatively inexpensive and easy to manufacture.

In accordance with one embodiment of the present invention, a waveguide and a reflective surface are formed on a surface of a substrate. In accordance with one aspect of this embodiment, the waveguide is formed by depositing waveguide material such as SiN, $SiO_x$, polymer material, or the like, patterning the material, and etching the material to form a desired pattern. In accordance with a further aspect of this embodiment, the waveguide material is patterned and etched to form a curved portion, suitable for focusing light, on one end of the waveguide. In accordance with one particular aspect of this embodiment, the waveguide material includes silicon oxide and is deposited using flame hydrolysis deposition. Cladding layers for the waveguide may be formed by depositing material about the waveguide and/or by implanting material into the waveguide to change the index of refraction of a portion of the waveguide material. Gratings on the waveguide material may be formed by one of several approaches. For example, gratings can be formed on waveguides using a mask and ultraviolet light exposure or by patterning photoresist material, exposing the patterned photoresist to ultraviolet radiation, and etching the unexposed waveguide material. In accordance with yet another aspect of this embodiment, the reflective surface is formed by etching a portion of a substrate material to form a reflective structure, and if desired, coating at least a portion of the reflective structure with a reflective material to increase the reflectivity of the surface.

In accordance with another embodiment of the invention, a reflective surface, which both reflects light to a desired direction and focuses the light to a desired location, is formed on a surface on a substrate. In accordance with one aspect of this embodiment, the reflective surface is formed by depositing a material such as silicon oxide patterning the silicon oxide material, and etching the material to form, e.g., a parabolic or ellipsoid surface, which if desired, may be coated with a reflective substance.

In accordance with a further embodiment of the invention, the reflective surface may be formed within a substrate by etching the substrate to formed the reflective surface, which, if desired, may be coated with a reflective material.

BRIEF DESCRIPTION OF THE DRAWINGS

A more complete understanding of the present invention may be derived by referring to the detailed description and claims, considered in connection with the figures, wherein like reference numbers refer to similar elements throughout the figures, and:

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF EXEMPLARY EMBODIMENTS

The present invention generally relates to optical interconnect structures. More particularly, the invention relates to optical interconnect structures configured to alter a light path of light transmitted to or emitted from an optoelectronic device or an optical transmission medium. The invention is conveniently described below in connection with optically coupling an optoelectronic device to a fiber of a optical cable. However, the invention may be used to optically couple the any light source (including a waveguide) to any light receiver (including another waveguide).

Figure 1:
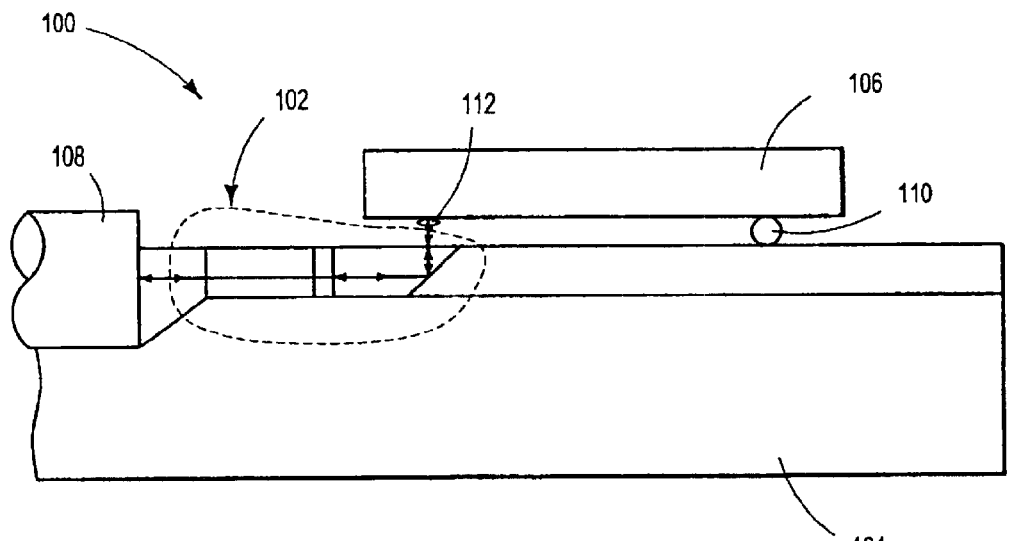
FIG. 1 is a schematic illustration of a portion of an optical interconnect system in accordance with the present invention.

FIG. 1 schematically illustrates a system 100, including an optical interconnect structure 102, in accordance with the present invention. System 100 includes structure 102, formed on or using a substrate 104, an optoelectronic device 106, and an optical fiber 108. System 100 may also optionally include a lens 112 to further focus light transmitted to or emitted from device 106.

In operation, light is transmitted between device 106 and fiber 108 using structure 102 to bend the light. As noted above, bending of the light is often desirable because optoelectronic devices often receive or emit light through and in a direction away from the same surface on which electrical connections (e.g., conductive bump 110) are formed, which direction is often perpendicular to a surface on which cable 108 receives or emits light. Although optical interconnect systems that include optoelectronic devices that emit light in a direction that is perpendicular to the receiving or emitting surface of cable 108 requires bending of light to increase optical efficiency of the system, such systems are often desirable because they allow relatively short electrical connections (e.g., bump 110) between device 102 and substrate 104 and between device 106 and other electronic devices such as drivers, amplifiers, and the like. In addition, surface emitting detectors and emitters may be manufactured and attached to substrate 104 in one dimensional or two dimensional arrays, are relatively inexpensive to manufacture, and in the case of emitters, often emit better quality light compared to edge emitters.

Optoelectronic device 106 may comprise either a light emitting device such as a light emitting diode, a vertical cavity surface emitting laser, or the like, or a light detecting device such as a pn junction diode, a metal-semiconductor-metal detector, a resonant cavity enhanced detector, or the like. Device 106 may be a discrete component or may be part of an array of optoelectronic devices, which may include any combination of emitters and detectors.

Fiber 108 may include any medium suitable for transferring light emitted from or received by device 106. In accordance with one embodiment of the invention, fiber 108 is an optical fiber from an MT series type fiber optic coupler.

Figure 2:
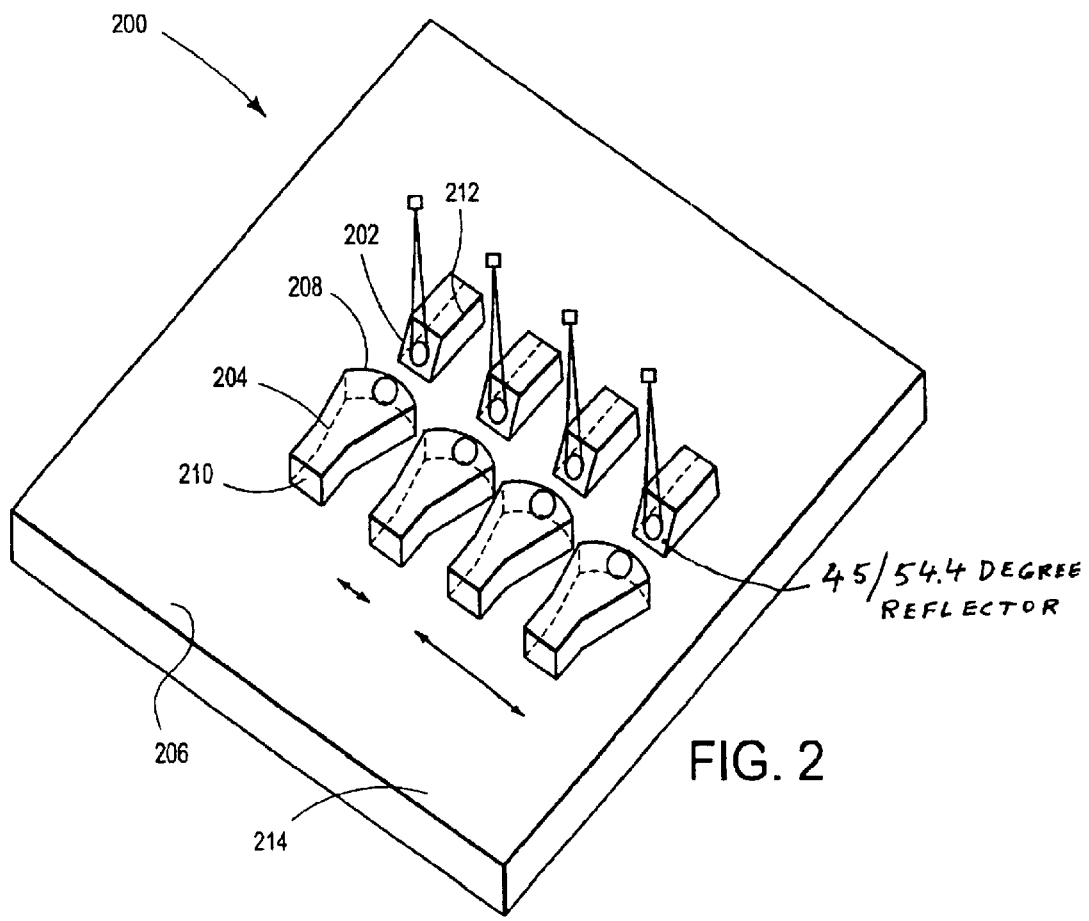
FIG. 2 is a perspective illustration of a waveguide having a curved end and a reflector structure formed on a surface of a substrate.
Figure 3:
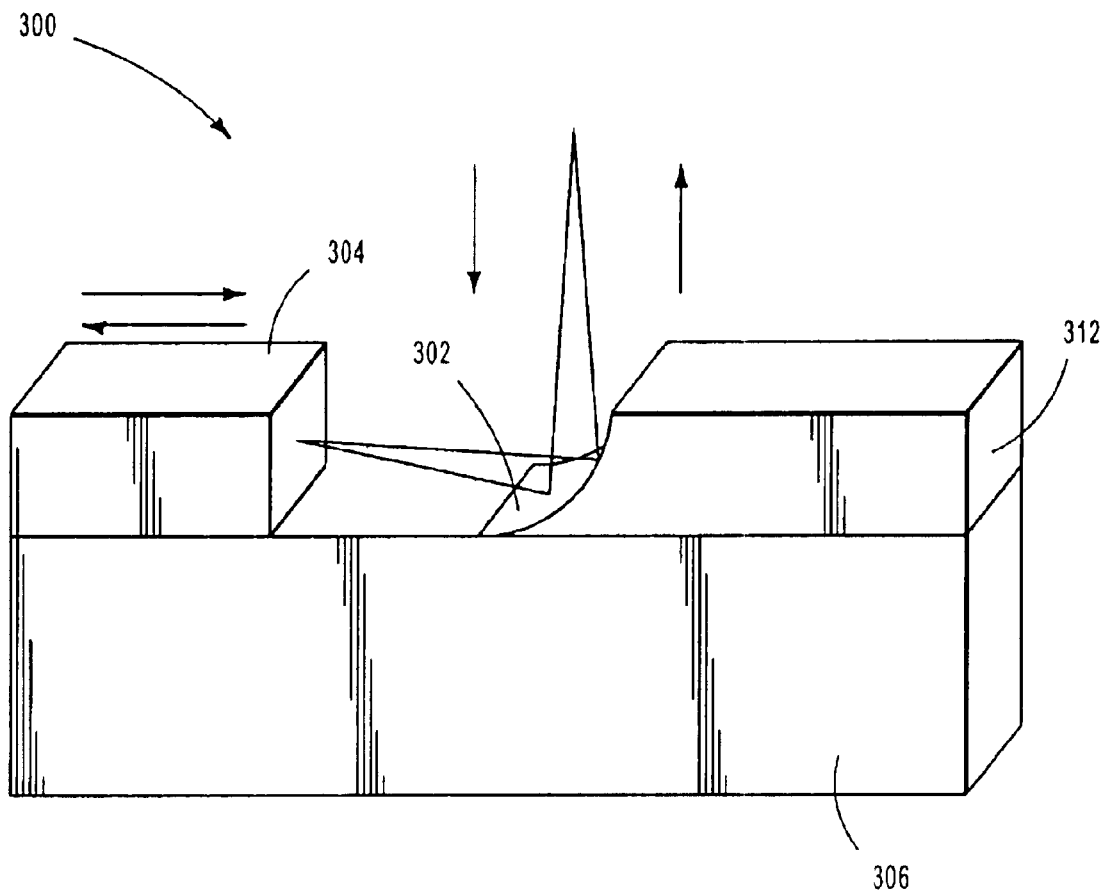
FIG. 3 is a schematic illustration of a waveguide and a curved reflective surface formed on a surface of a substrate.

Optical interconnect structures (e.g. structure 102) in accordance with various embodiments of the invention are illustrated in FIGS. 2–3. As explained in more detail below, each optical interconnect structure includes a reflecting surface and a curved surface to, respectfully, direct and focus light to a desired location.

FIG. 2 illustrates an optical interconnect structure 200 that includes a reflecting surface 202 and a waveguide 204 formed on a surface of a substrate 206. In accordance with this embodiment of the invention, waveguide 204 includes a curved surface or lens 208 configured to obtain the desired focusing of light transmitted to or from the waveguide.

The configuration of curved surface 208 may vary in accordance with various applications and may be selected based on several factors. The radius of curvature may also be selected based on a various factors such as divergence angle of the incident light, effective refractive index of material comprising waveguide 204, the wavelength or wavelengths of light transmitted through structure 200, the distance from source or receiving apertures and the like. Furthermore, although illustrated with a substantially planar surface 210, waveguides in accordance with the present invention may suitably include a second curved surface in place of planar surface 210. The radius of curvature of surface 208 may be selected, for example, using Equation 1, where f is the focal length of the transmitted light, $\mu$ is the effective refractive index of the waveguide, and R is the radius of curvature.

$$1/f=(\mu-1)1/R \qquad \text{Equation 1}$$

Materials used to form waveguide 204 may also vary from application to application. In general, material used to form waveguide 204 includes at least one layer of material that efficiently transmits light of desired wavelength(s). Exemplary materials suitable for forming waveguide 204 include silicon nitride, silicon oxide, polymers and plastics, glasses, and the like, which material may include one or more dopants to alter the refractive index of the material. Waveguides in accordance with the present invention may also suitably include one or more cladding layers to facilitate efficient light transmission. Alternatively, the substrate and air may serve as cladding material in waveguide 204, in which case structure 200 does not include additional cladding layers. One or more cladding layers may be formed by implanting material into a portion of the waveguide structure to alter the index of refraction of a portion of the waveguide. In addition, optical gratings may be formed on the waveguide structure by patterning photoresist or by etching the waveguide material to form the desired grating pattern. Forming a grating on the waveguide may be desirable to form passive devices such as demultiplexers, and switches may be coupled to the waveguide with the grating to form active devices such as cross-connects or add/drop multiplexers.

Reflecting surface 202 may be formed either on or within substrate 206. In the case of the embodiment illustrated in FIG. 2, reflecting surface 202 is formed as part of a reflecting structure 212, which is formed on substrate 206. Structure 212 may be formed of any suitable material, such as materials used to form waveguide 204, substrate material such as silicon, or the like. Reflective surface 202 may additionally include a material such as gold, silver, platinum, which is coated onto a surface of structure 212.

Surface 202 is formed at an angle of about 90 degrees to about 180 degrees with respect to a surface 214 of substrate 206 to direct light in a desired direction and facilitate efficient light transfer between an optoelectronic device and waveguide 204. The desired angle of surface 202 with respect to surface 124 may depend on several factors such as the configuration of waveguide 204 and placement of the optoelectronic device relative to surface 202. In accordance with one exemplary embodiment of the invention, surface 202 is angled at about 135 degrees with respect to surface 214 and the center of height of surface 202 is about the same as the center of height of waveguide 204.

Substrate 206 may be formed of any suitable material. In accordance with one exemplary embodiment of the invention, substrate 206 includes silicon semiconductor material as is often used in semiconductor device manufacturing and further includes various electrical interconnects to couple an optoelectronic device to another microelectronic circuit such as a driver or an amplifier (e.g., to couple device 106 to an amplifier or driver).

FIG. 3 illustrates an optical interconnect structure 300 in accordance with another embodiment of the invention. Similar to structure 200, structure 300 includes a reflecting surface 302 formed on a structure 312 and a waveguide 304 formed on a surface of a substrate 306; structure 312, surface 302, substrate 306, and waveguide 304 may be formed of the same materials described above in connection with structure 212, surface 202, substrate 206, and waveguide 204. In accordance with this embodiment of the invention, reflective surface 302 is curved to facilitate focusing of light transmitted between an optoelectronic device and a waveguide 108.

The interconnect structures in accordance with the present invention may be formed by depositing material such as silicon oxide using a deposition process such as flame hydrolysis deposition, patterning and etching the material to form the waveguide and reflective structure, and coating a portion of the reflective structure with reflective material such as gold, silver or platinum, using for example, evaporation or chemical vapor deposition techniques. The etching process employed in accordance with the present invention may include an isotropic etch (e.g., wet etch) process, an anisotropic (e.g., a dry etch) process, or a combination of both isotropic and anisotropic etch processes to form the desired configuration of the waveguide and the reflective structure. For example, an anisotropic etch process can be used to form waveguide 204 and reflective structure 212, illustrated in FIG. 2, whereas an anisotropic etch may be used to form waveguide 304 and isotropic etch or a combination of isotropic and anisotropic etches may be used to form reflective structure 312.

In accordance with a preferred method of the present invention, an optical interconnect structure is formed by etching a silicon substrate with potassium hydroxide (KOH) at a controlled temperature to form reflecting structures (e.g., structures 212) on the substrate surface, thereby forming a reflecting surface 202 along the crystalline plane of the silicon. The crystalline plane of silicon forms an angle of approximately 125.6 degrees. Silicon oxide is then deposited onto the surface of the substrate using flame hydrolysis deposition, and the oxide is patterned and etched to form the waveguides (e.g., waveguides 204 or 304). A reflective coating is then deposited (e.g., using a flash deposition or evaporation process) onto a portion of the reflective, using photoresist as mask; conductive bond pads may also be formed on the surface of the substrate during this process. The centers of the waveguides are preferably aligned in the x, y, z directions with respect to the centers of the reflecting surface.

While the present invention is set forth herein in the context of the appended drawing figures, it should be appreciated that the invention is not limited to the specific form shown. For example, although the optical interconnect structures and systems including the structures are conveniently illustrated with about a 90 degree bend in a light path, the interconnect structures may be configured to bend or contour light in any desired direction. Various other modifications, variations, and enhancements in the design and arrangement of the method and apparatus set forth herein, may be made without departing from the spirit and scope of the present invention.

We claim:

1. An optical interconnect structure with integral reflective surface and lens comprising:

a substrate;

a plurality of waveguides formed on said substrate, each of said waveguides having a cylindrical lens formed on at least one end thereof; and a plurality of reflective structures formed of the same material as the substrate and integral with said substrate, each reflective structure having a reflective surface optically aligned with a corresponding one of the plurality of waveguides, the structure configured to reflect light between the waveguides and a plurality of optoelectronic devices attached to the substrate.

2. An optical interconnect structure as in claim 1, the radius of curvature (R) of the cylindrical lenses is selected in accordance with a formula expressed as follows:

$$1/f = (u-1)1/R$$

"f" being the focal length of the lenses; and

"u" being the refractive index of the waveguide.

3. An optical interconnect structure as in claim 1 wherein said substrate comprises silicon.

4. An optical interconnect structure as in claim 3, wherein said reflective structures have their reflective surfaces formed at an angle of approximately 125 degrees.

5. An optical interconnect structure as in claim 1, wherein said optoelectronic device is a vertical cavity surface emitting laser.

* * * * *